(No Model.)
J. J. POWERS.
DISINFECTING TANK FOR THE DISPOSAL OF SEWAGE.
No. 292,046. Patented Jan. 15, 1884.
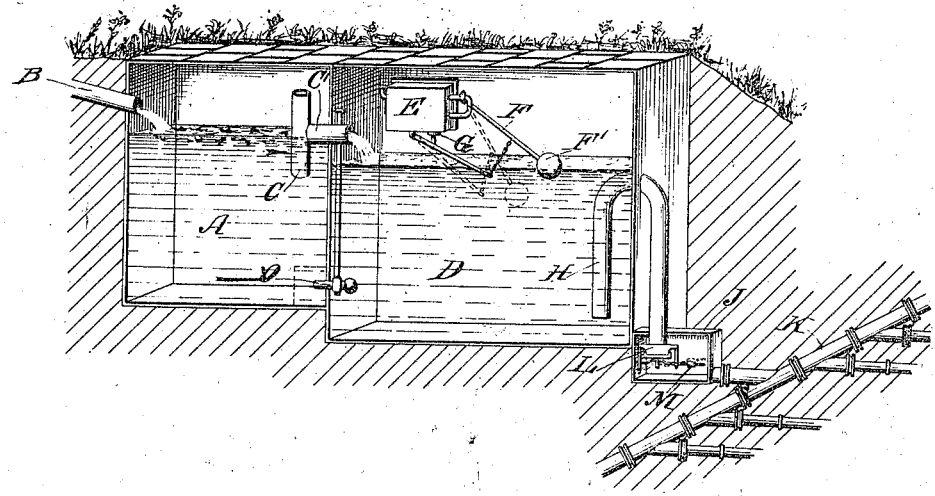
WITNESSES:
John H. Deemer
C. Sedgwick
INVENTOR:
J. J. Powers
BY Munn & Co.
ATTORNEYS.

UNITED STATES PATENT OFFICE.

JAMES J. POWERS, OF BROOKLYN, NEW YORK.

DISINFECTING-TANK FOR THE DISPOSAL OF SEWAGE.

SPECIFICATION forming part of Letters Patent No. 292,046, dated January 15, 1884.

Application filed October 1, 1883. (No model.)

*To all whom it may concern:*

Be it known that I, JAMES J. POWERS, of Brooklyn, in the county of Kings and State of New York, have invented a new and Improved Disinfecting-Tank for the Disposal of Sewage, of which the following is a full, clear, and exact description.

The object of my invention is to provide a new and improved disinfecting-tank for the disposal of sewage in such a manner that no smell or stench can arise and the subsoil will not be polluted.

The invention consists in a combination, with a settling-tank, of a disinfecting-tank, and a smaller tank for receiving a disinfecting-liquid, which smaller tank is provided with means for automally discharging the disinfecting-liquid into the disinfecting-tank. The fluids are withdrawn from the disinfecting-tank by a siphon, the outer end of which is closed by an automatically-closing valve, and is contained within a smaller tank connected with a series of absorption or drain tiles, and with pipes for conducting off the liquid.

Reference is to be had to the accompanying drawing, forming part of this specification, in which a longitudinal sectional elevation of my improved disinfecting-tank is shown.

The sewage is conducted into a settling basin or tank, A, through a pipe, B. A pipe, C, open at the top and bottom, and provided with a lateral outlet, C', projecting into the disinfecting-tank D, conducts the sewage from the tank A to tank D.

In the upper part of the tank D a smaller tank, E, is contained which is provided with a lever, F, provided at its free end with a float, F', which lever F is so arranged that it can open a valve, G, in the bottom of the tank E, and permit the disinfecting-liquid which is contained in the tank E to flow into the liquid contained in the tank D. The lever F and the valve G can be combined to operate in any well-known manner. A siphon, H, has one end in the tank D near the bottom of the same, and the other end projects into a small box or tank, J, with which a number of tiles, K, are connected, the said tiles being united by loose joints, and being placed a short distance below the surface of the ground.

That end of the siphon H within the small tank J is closed by a valve, L, formed on one end of a lever, M, pivoted in the tank J, which lever M is so weighted that the valve L will be pressed automatically against the bottom of the outer shank of the siphon. The tank A is provided at its bottom with an outlet, O, which can be opened to permit withdrawing the fluid from the tank A in case solids that have collected in the bottom of the tank are to be removed.

The operation is as follows: The sewage flows into the tank A through the pipe B, and through pipes C C' into the tank D, the solids and heavy parts accumulating on the bottom of the tank A. When the tank D is filled to about two-thirds of its height, the float F' will be raised so high that it can open valve G, thus permitting the disinfecting-liquid contained in the tank E to mix with the sewage in the tank D, and thereby the sewage will be thoroughly disinfected. If the water in the tank E rises to about two-thirds of its height, the pressure of the column of water in the siphon will be so great that it can overcome the weight holding the valve L against the lower end of the outer shank of the siphon, thereby starting the siphon which continues to siphon the water out of the tank D until the same is empty or nearly so. The tiles are laid close enough to the surface for the vegetation to absorb the nutriment. The fluid contents are removed every one or more days according to the capacity of the tank, so that the sewage never remains a sufficient time to become putrid, and the intervals between the charges at the same time allow a sufficient time for the absorption and assimilation of the fluids by the roots in the surrounding earth.

The tank can also be arranged to discharge into a stream, river, &c., as all the solids are removed and the fluids are thoroughly disinfected.

Having thus described my invention, what I claim as new, and desire to secure by Letters Patent, is—

1. The combination, with a settling-tank, of a disinfecting-tank, a tank for containing a disinfecting-liquid, and a series of absorption or drain tiles for carrying off the liquid sewage from the disinfecting-tank, substantially as herein shown and described, and for the purpose set forth.

2. The combination, with a settling-tank and a disinfecting-tank, of a tank for receiving disinfecting-liquid, and provided with means for automatically discharging the disinfecting-liquid, a siphon for conducting the liquids from the disinfecting-tank, a tank into which the free end of the siphon discharges, and tiles connected with the last-mentioned tank, substantially as herein shown and described, and for the purpose set forth.

3. The combination, with a settling-tank and a disinfecting-tank, of a tank containing a disinfecting-liquid, and provided with devices for automatically discharging the disinfecting-liquid, a siphon for conducting the liquid out of the disinfecting-tank, an automatically-closing valve at the lower end of the outer shank of the siphon, and a tank into which the outer end of the siphon projects, substantially as herein shown and described, and for the purpose set forth.

JAMES J. POWERS.

Witnesses:
 OSCAR F. GUNZ,
 C. SEDGWICK.